(12) United States Patent
Jin (10) Patent No.: US 12,005,860 B2
(45) Date of Patent: Jun. 11, 2024

(54) VEHICLE AND METHOD FOR PREVENTING MALFUNCTION OF TOUCH SENSOR IN VEHICLE DOOR

(71) Applicants: Hyundai Motor Company, Seoul (KR); Kia Motors Corporation, Seoul (KR)

(72) Inventor: Dae Sung Jin, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 883 days.

(21) Appl. No.: 17/008,160

(22) Filed: Aug. 31, 2020

(65) Prior Publication Data

US 2021/0362678 A1   Nov. 25, 2021

(30) Foreign Application Priority Data

May 19, 2020   (KR) .................. 10-2020-0059702

(51) Int. Cl.
| | |
|---|---|
| *B60R 25/24* | (2013.01) |
| *B60R 25/01* | (2013.01) |
| *B60R 25/30* | (2013.01) |
| *G01D 5/24* | (2006.01) |
| *G01S 13/76* | (2006.01) |
| *H04B 1/3822* | (2015.01) |

(52) U.S. Cl.
CPC ............ *B60R 25/245* (2013.01); *B60R 25/01* (2013.01); *B60R 25/302* (2013.01); *G01D 5/24* (2013.01); *G01S 13/767* (2013.01); *H04B 1/3822* (2013.01); *B60R 2325/101* (2013.01); *B60R 2325/103* (2013.01); *B60R 2325/105* (2013.01)

(58) Field of Classification Search
CPC ..... B60R 25/245; B60R 25/01; B60R 25/302; G01D 52/24; G01S 13/767
See application file for complete search history.

(56) References Cited

U.S. PATENT DOCUMENTS

| | | | |
|---|---|---|---|
| 2014/0285319 A1* | 9/2014 | Khan | B60R 25/00 340/5.61 |
| 2017/0317825 A1* | 11/2017 | Tercero | H04L 9/10 |
| 2021/0011143 A1* | 1/2021 | Naiki | G01S 13/88 |

* cited by examiner

*Primary Examiner* — Kevin A Lathers
(74) *Attorney, Agent, or Firm* — Fox Rothschild LLP (57) ABSTRACT

A vehicle and a method are configured to prevent malfunction of a touch sensor in a vehicle door. The vehicle includes a transceiver for transmitting a searching signal to a smart key located outside the vehicle and receiving a response signal to the searching signal, at least one touch sensor mounted in a door of the vehicle to sense a touch input of a user in a capacitive scheme, and a controller that determines an approach direction of the smart key based on the response signal and controls to operate only a touch sensor installed in a door mapped to the approach direction among the at least one touch sensor.

18 Claims, 4 Drawing Sheets

VEHICLE AND METHOD FOR PREVENTING MALFUNCTION OF TOUCH SENSOR IN VEHICLE DOOR

CROSS-REFERENCE TO RELATED APPLICATION

This application claims under 35 U.S.C. § 119(a) the benefit of Korean Patent Application No. 10-2020-0059702, filed in the Korean Intellectual Property Office on May 19, 2020, the entire contents of which are incorporated herein by reference.

BACKGROUND

(a) Technical Field

The present disclosure relates to a vehicle and a method for preventing malfunction of a touch sensor in a vehicle door.

(b) Description of the Related Art

As vehicle door handle technology develops, various types of door handles such as a plush type door handle in which a handle protrudes from an inside of a door panel when a driver approaches, a touch type door handle that may be locked or unlocked by simply touching a door while holding a vehicle key (e.g., a smart key), and the like have been mounted on a vehicle. In particular, the touch type door handle supports passive entry that operates based on a capacitive touch sensor. The capacitive touch sensor mounted in the touch type door handle may incorrectly sense a touch by rainwater as a human touch in inclement weather. Problems such as discharge of a vehicle battery, unintentional unlocking of the vehicle door by a user, and the like may occur because of the incorrect sensing of the touch by the capacitive touch sensor.

SUMMARY

An aspect of the present disclosure provides a vehicle and a method for preventing malfunction of a touch sensor in a vehicle door that prevent the malfunction of the touch sensor by operating the touch sensor in the vehicle door based on an approach direction of a smart key located outside the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle includes a transceiver for transmitting a searching signal to a smart key located outside the vehicle and receiving a response signal from the smart key, at least one touch sensor mounted in a door of the vehicle to sense a touch input of a user in a capacitive scheme, and a controller that determines an approach direction of the smart key based on the response signal and controls to operate only a touch sensor installed in a door mapped to the approach direction among the at least one touch sensor.

In one embodiment, the transceiver may include at least two LF antennas respectively installed on the doors of the vehicle, and a communication circuit for transmitting searching signals and receiving response signals using the at least two antennas, wherein the communication circuit supports at least one of an Ultra Wideband (UWB), a Bluetooth (BLE), a Near Field Communication (NFC), a Radio Frequency Identification (RFID), or a Low Frequency (LF).

In one embodiment, the controller may drive the at least two antennas in a predetermined order to respectively transmit the searching signals, and determine the approach direction of the smart key based on reception timings of the response signals to the transmitted searching signals, respectively.

In one embodiment, the controller may drive the at least two antennas in a predetermined order to respectively transmit the searching signals, and determine the approach direction of the smart key based on signal strengths of the respective searching signals respectively included in the response signals to the respective transmitted searching signals.

In one embodiment, the controller is configured to determine the approach direction of the smart key using a triangulation method.

In one embodiment, the controller may switch an operation mode of the touch sensor installed in the door mapped to the approach direction from a sleep mode to a wake-up mode.

In one embodiment, the controller may lock or unlock the vehicle door based on a location of the smart key when sensing the touch input of the user through the touch sensor installed in the door mapped to the approach direction.

In one embodiment, the controller may unlock the door mapped to the approach direction when a distance between the smart key and the vehicle is equal to or less than a predetermined critical distance.

In one embodiment, the controller may switch the operation mode of the touch sensor from the wake-up mode to the sleep mode when the touch input of the user is not sensed for a predetermined time through the touch sensor installed in the door mapped to the approach direction.

In one embodiment, the controller may store a failure code when the at least one touch sensor fails to activate a sleep mode for a predetermined number of times or more.

According to another aspect of the present disclosure, a method for preventing a malfunction of at least one touch sensor mounted in a door of the vehicle, the at least one touch sensor configured to sense a touch input of a user in a capacitive scheme, includes: determining, by a controller, an approach direction of a smart key based on a response signal from the smart key to a searching signal transmitted by a transceiver of the vehicle to search for the smart key located outside the vehicle, and controlling, by the controller, to operate only a touch sensor installed in a door mapped to the approach direction among the at least one touch sensor.

In one embodiment, the determining of the approach direction of the smart key may include transmitting the searching signals respectively through at least two antennas based on a wireless communication technology, and receiving the response signals using the wireless communication technology, wherein the wireless communication technology is used at least one of an Ultra Wideband (UWB), a Bluetooth (BLE), a Near Field Communication (NFC), a Radio Frequency Identification (RFID), or a Low Frequency (LF).

In one embodiment, the transmitting of the searching signals may include driving the at least two antennas in a predetermined order and transmitting the searching signals respectively through the antennas.

In one embodiment, the determining of the approach direction of the smart key includes determining the approach direction based on reception timings of the respective response signals or signal strengths of the respective searching signals included in the respective response signals.

In one embodiment, the controlling to operate only the touch sensor installed in the door mapped to the approach direction may include instructing, by a controller, the touch sensor installed in the door mapped to the approach direction to activate a wake-up mode, and switching, by the touch sensor installed in the door mapped to the approach direction, an operation mode from a sleep mode to the wake-up mode.

In one embodiment, the method may further include sensing the touch input of the user through the touch sensor installed in the door mapped to the approach direction, and locking or unlocking the door based on a location of the smart key when the touch input of the user is sensed.

In one embodiment, the locking or unlocking of the door may include detecting a distance between the smart key and the vehicle, and unlocking the door mapped to the approach direction when the detected distance is equal to or less than a predetermined critical distance.

In one embodiment, the method may further include switching an operation mode of the touch sensor from a wake-up mode to a sleep mode when the touch input of the user is not sensed for a predetermined time through the touch sensor installed in the door mapped to the approach direction.

In one embodiment, the method may further include instructing the at least one touch sensor to activate a sleep mode when the response signal is not received for a predetermined time.

In one embodiment, the method may further include storing a failure code when the at least one touch sensor fails to activate a sleep mode for a predetermined number of times or more.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
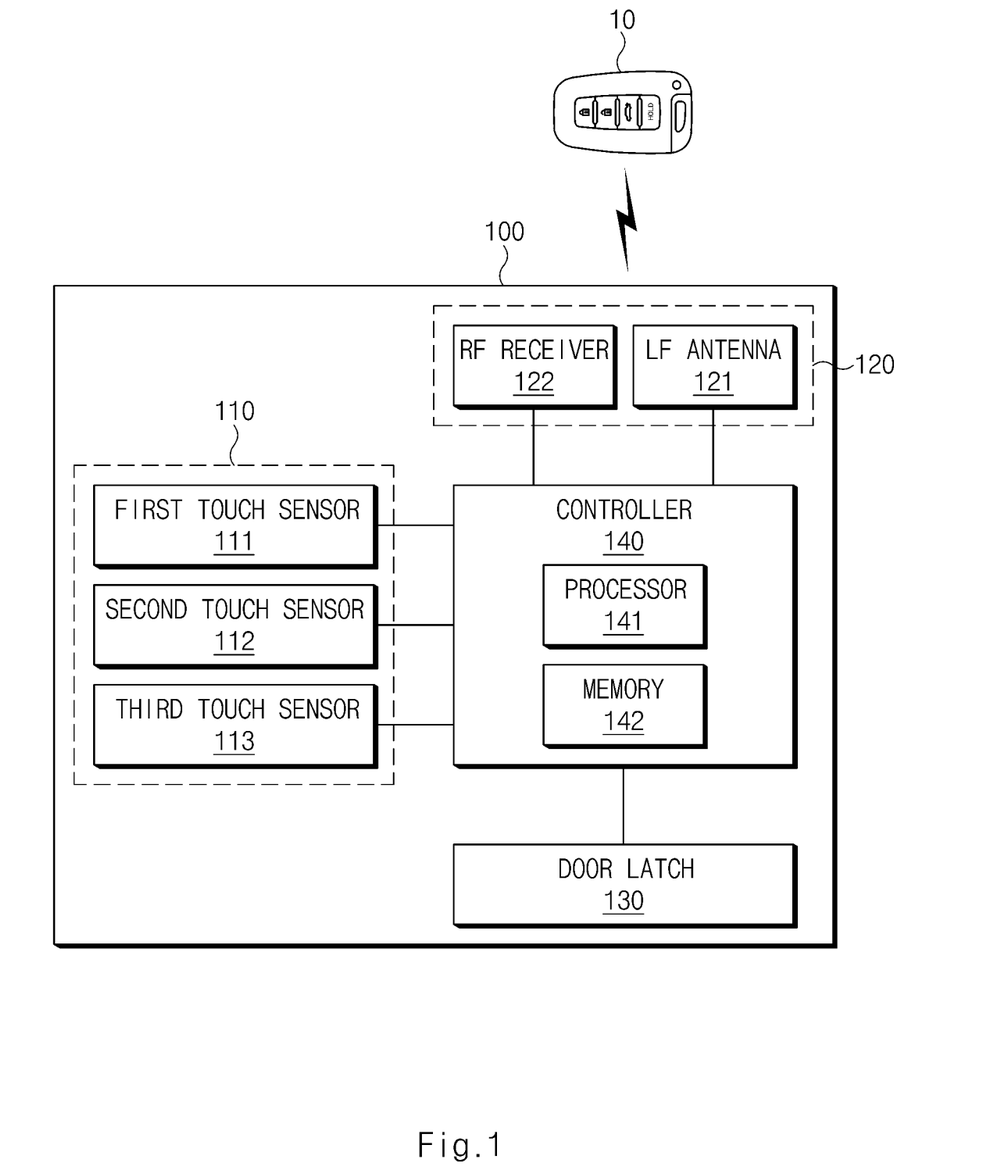
FIG. 1 is a block diagram of a vehicle according to an embodiment of the present disclosure.
Figure 2:
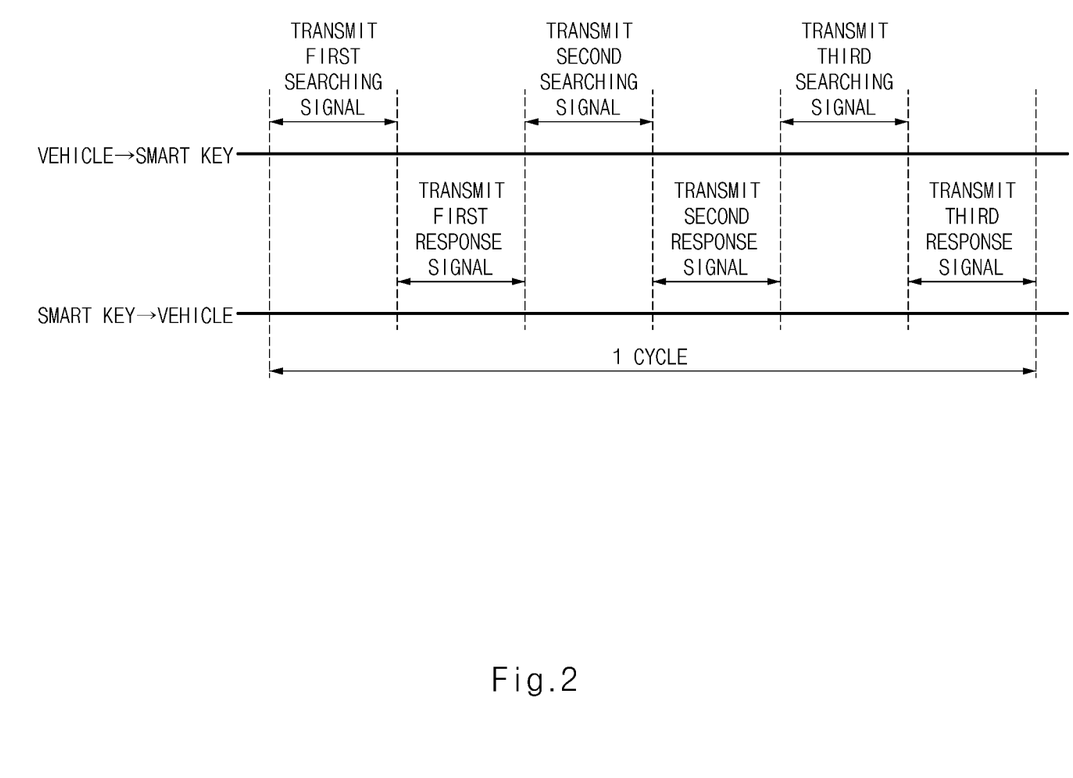
FIG. 2 is a view for describing a method for determining an approach direction of a smart key according to an embodiment of the present disclosure.

FIG. 1 is a block diagram of a vehicle according to an embodiment of the present disclosure. Further, FIG. 2 is a view for describing a method for determining an approach direction of a smart key according to an embodiment of the present disclosure.

Referring to FIG. 1, a vehicle 100 senses a smart key 10 located outside the vehicle 100 and switches a state of a vehicle door to a locked or an unlocked state based on a distance from the smart key 10. In this connection, the smart key 10, which is a remote controller that may remotely control the vehicle 100, may be implemented as a smart key fob, a key fob, a keyless go card, or a smartphone. Although not shown in the drawing, the smart key 10 may include an LF receiver that receives a low frequency (LF) signal transmitted from the vehicle 100, an RF transmitter that transmits a radio frequency (RF) signal, a processor that controls overall operations of the smart key 10, and a memory that stores software executed by the processor.

The vehicle 100 includes a touch detector 110, a transceiver 120, a door latch 130, and a controller 140.

The touch detector 110 includes one or more touch sensors 111 to 113 respectively mounted in door handles of the vehicle 100. For example, the first touch sensor 111, the second touch sensor 112, and the third touch sensor 113 may be respectively installed in a driver's seat door handle, a passenger seat door handle, and a trunk door handle of the vehicle. FIG. 1 illustrates that the three touch sensors 111 to 113 are arranged in the vehicle 100, but the present disclosure is not limited thereto. Further, each touch sensor may be installed in each of all door handles of the vehicle 100.

The first to third touch sensors 111 to 113, which are capacitive touch sensors, are configured to sense a change in capacitance resulted from contact with a human body or a specific object and convert the change in the capacitance into an electrical signal. The first to third touch sensors 111 to 113 output high or low based on whether the change in the capacitance generated when in contact with the human body exceeds a preset threshold. The controller 140 may determine that a touch input of a user has occurred when receiving the high signal from the touch sensor 111, 112, or 113, and determine that the touch input of the user has not occurred when receiving the low signal.

The transceiver 120 includes at least two LF antennas 121 arranged on the door handle of the vehicle. For example, each LF antenna 121 may be installed on each of the driver's seat door handle, the passenger seat door handle, and the trunk door handle. In the drawing, one LF antenna 121 is disclosed, but the present disclosure is not limited thereto. The number of arranged LF antennas 121 may be the same as the number of door handles of the vehicle. Alternatively, the LF antennas may be respectively arranged at front, rear, and side portions of the vehicle 100. The LF antenna 121 transmits a searching signal for searching for the smart key 10 in a LF band in response to an instruction of the controller 140, that is, an LF signal.

The transceiver 120 may further include an RF receiver 122 that receives a response signal from the smart key 10. The RF receiver 122 may receive the response signal (i.e., an RF signal) in an RF band. The response signal may include information on a signal strength of the LF signal. The smart key 10 measures the signal strength (i.e., a frequency magnitude) of the LF signal when receiving the LF signal transmitted from the vehicle 100. The smart key 10 transmits the response signal including the measured signal strength of the LF signal as the RF signal. When receiving the response signal from the smart key 10, the RF receiver 122 transmits the received response signal to the controller 140.

The transceiver 120 may be implemented as a communication device for supporting wireless communication between the vehicle 100 and the smart key 10. The wireless communication may use at least one of Ultra Wideband (UWB), Bluetooth (BLE), Near Field Communication (NFC), or Radio Frequency Identification (RFID). The communication device may include at least two antennas arranged on the door handle of the vehicle. The communication device may include a communication circuit transmitting the searching signal and receiving the response signal using the at least two antennas. The smart key 10 may include a communication circuit supporting wireless communication with the vehicle 10.

The door latch 130 is connected to the door handle of the vehicle 100 to assist vehicle door opening and closing of the user. In addition, the door latch 130 may be coupled to a door striker to lock or unlock the vehicle door.

The controller 140 may be independently implemented as shown in FIG. 1 or may be implemented as an identity authentication unit (IAU) that performs user authentication processing or an integrated body unit (IBU) that performs functions such as vehicle body control, smart key control, and the like. Referring to FIG. 1, the controller 140 includes a processor 141 and a memory 142. The processor 141 controls overall operations of the controller 140. The processor 141 may be implemented as at least one of an application specific integrated circuit (ASIC), a digital signal processor (DSP), a programmable logic device (PLD), a field programmable gate array (FPGA), a central processing unit (CPU), a microcontroller, and a microprocessor. The memory 142 may store software programmed for the processor 141 to perform a predetermined operation. In addition, the memory 142 may store input data and/or output data based on an operation of the processor 141. The memory 142 may be implemented as at least one of storage media (recording media) such as a flash memory, a hard disk, an SD card (Secure Digital Card), a RAM (Random Access Memory), a SRAM (Static RAM), a ROM (Read Only Memory), a PROM (Programmable ROM), an EEPROM (Electrically Erasable PROM), an EPROME (Erasable and Programmable ROM), a register, a removable disk, and the like.

When the smart key 10 is located outside the vehicle 100, the controller 140 operates the LF antenna 121 to transmit the searching signal (that is, the LF signal). The controller 140 may transmit the searching signal through the LF antenna 121 at a predetermined cycle.

After transmitting the searching signal, the controller 140 determines whether the smart key 10 is sensed based on whether the response signal to the transmitted searching signal is received. When receiving the response signal within a predetermined time after transmitting the searching signal, the controller 140 recognizes that the smart key 10 is located within a critical distance (e.g., 2 m) from the vehicle 100. The critical distance refers to a distance at which LF communication and/or RF communication may be achieved. In other words, when receiving the response signal from the smart key 10, the controller 140 determines that the vehicle 100 has sensed the smart key 10. When not receiving the response signal from the smart key 10 within the predetermined time after transmitting the searching signal, the controller 140 recognizes that the smart key 10 has deviated from a vicinity of the vehicle 100. That is, the controller 140 determines that the vehicle 100 has not sensed the smart key 10.

When it is recognized that the smart key 10 has deviated from the vicinity of the vehicle, the controller 140 instructs (commands) each of the first touch sensor 111 to the third touch sensor 113 to activate a sleep mode. Each of the first touch sensor 111 to the third touch sensor 113 switches an operation mode thereof from an active mode to the sleep mode in response to the instruction of the controller 140. Each touch sensor 111, 112, or 113 attempts to activate the sleep mode and then transmits, to the controller 140, whether the sleep mode activation is completed, that is, the sleep mode activation result.

In addition, when the smart key 10 has deviated from the vicinity of the vehicle, the controller 140 identifies the state of the vehicle door and controls the door latch 130 to switch the state of the vehicle door from the unlocked state to the locked state when the vehicle door is in the unlocked state.

When the vehicle door is in the locked state and the first touch sensor 111 to the third touch sensor 113 are in the sleep mode, the controller 140 transmits the searching signal through the LF antenna 121 at the predetermined cycle. In this connection, the controller 140 may transmit the searching signal by driving the at least two LF antennas in a predetermined order. When receiving the response signal from the smart key 10 within the predetermined time after transmitting the searching signal, the controller 140 recognizes that the smart key 10 is approaching the vehicle.

In addition, the controller 140 may determine an approach direction of the smart key 10, that is, an approach direction of the user based on the response signal received from the smart key 10 after transmitting the searching signal. In particular, the controller 140 may determine the approach direction of the smart key based on a timing of receiving the response signal from the smart key 10. Alternatively, the controller 140 may determine the approach direction of the smart key 10 based on the signal strength of the searching signal included in the response signal to the transmitted searching signal.

For example, as shown in FIG. 2, the controller 140 transmits a first searching signal through a first LF antenna mounted on the driver's seat door handle, and receives a first response signal of the smart key 10 to the first searching signal. Subsequently, the controller 140 transmits a second searching signal through a second LF antenna mounted on the passenger seat door handle, then receives a second response signal to the second searching signal, then transmits a third searching signal through a third LF antenna mounted on the trunk door handle, and then receives a third response signal to the third searching signal. The controller 140 may recognize, as the approach direction of the smart key 10, a direction in which a door handle equipped with a LF antenna, which transmitted a searching signal that is mapped to a response signal with the least reception timing among reception timings (that is, times consumed to receive the response signals after transmitting the searching signals, respectively) of the first to third response signals, is mounted. Alternatively, the controller 140 compares signal strengths of the first to third searching signals respectively included in the first to third response signals to select a searching signal having the largest signal strength, and recognizes, as the approach direction of the smart key 10, a direction in which a door handle equipped with a LF antenna, which transmitted the selected searching signal, is mounted. The controller 140 may recognize the approach direction of the smart key 10 using a triangulation method, when the vehicle 100 and the smart key 10 include respectively communication circuits for supporting the wireless communication protocol.

The controller 140 instructs wake-up to the touch sensor 111, 112, or 113 mounted in the vehicle door handle mapped to the determined approach direction of the smart key 10. The touch sensor 111, 112, or 113 that received the wake-up command from the controller 140 switches the operation mode from the sleep mode to a wake-up mode. The controller 140 may sense the touch input of the user through the awakened touch sensor 111, 112, or 113. When sensing the touch input of the user, the controller 140 identifies the location of the smart key 10. In other words, the controller 140 identifies the distance between the vehicle 100 and the smart key 10. When the distance between the vehicle 100 and the smart key 10 is within a predetermined reference distance, the controller 140 controls the door latch 130 to unlock the vehicle door. When unlocking the vehicle door, the controller 140 may only unlock a vehicle door that matches the approach direction of the smart key 10. In addition, the controller 140 may unlock only a vehicle door in which a touch sensor that sensed the touch input of the user is mounted.

When the distance between the vehicle 100 and the smart key 10 is larger than the reference distance, the controller 140 switches the unlocked state of the vehicle door to the locked state through the door latch 130. At this time, the controller 140 maintains a current state when the state of the vehicle door is the locked state.

Figure 3:
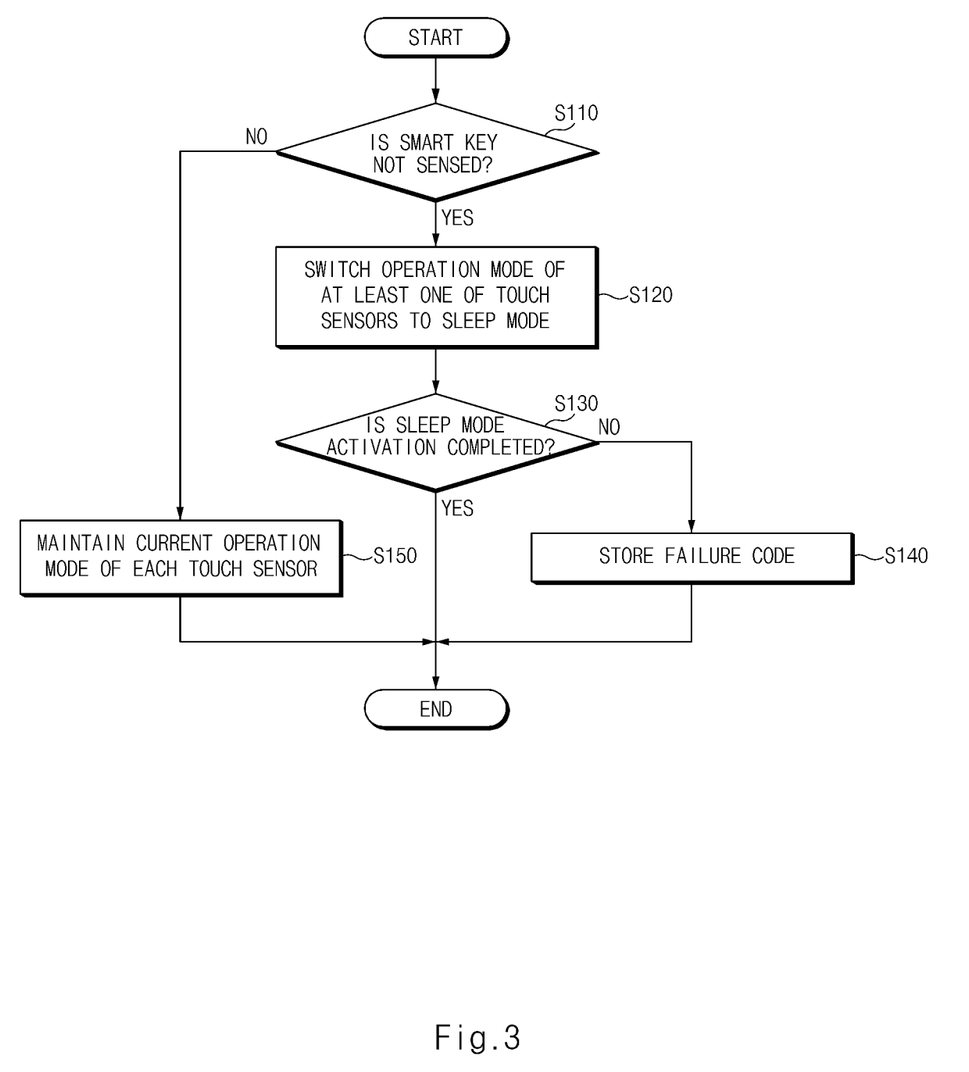
FIG. 3 is a flowchart illustrating a process of activating a sleep mode of a touch sensor in a vehicle door according to an embodiment of the present disclosure.

FIG. 3 is a flowchart illustrating a process of activating a sleep mode of a touch sensor in a vehicle door according to an embodiment of the present disclosure.

The controller 140 determines whether the smart key 10 is not sensed in the vicinity of the vehicle (S110). The controller 140 drives the LF antenna 121 to search for the smart key 10 located in the vicinity of the vehicle and transmits the searching signal as the LF signal. When receiving the response signal from the smart key 10 within the predetermined time after transmitting the searching signal, the controller 140 determines that the smart key 10 is located in the vicinity of the vehicle (that is, the smart key is sensed). On the other hand, when not receiving the response signal from the smart key 10 within the predetermined time after transmitting the searching signal, the controller 140 determines that the smart key 10 has deviated from the vicinity of the vehicle (that is, the smart key is not sensed).

When the smart key 10 is not sensed in the vicinity of the vehicle, the controller 140 switches the operation mode of the at least one of the touch sensors 111 to 113 to the sleep mode (S120). When the smart key 10 has deviated from the vicinity of the vehicle and not sensed, the controller 140 commands each of the at least one of the first to third touch sensors 111 to 113 mounted in each of the vehicle door handles to activate the sleep mode. Each of the at least one of the first to third touch sensors 111 to 113 attempts to activate the sleep mode in response to the command of the controller 140, and then transmits the sleep mode activation result to the controller 140. Each of the at least one of the touch sensors 111 to 113 switches the operation mode from the active mode to the sleep mode. When the switch to the sleep mode is completed (succeeds), each of the at least one of the touch sensors 111, 112, and 113 transmits a result information notifying the completion of the sleep mode activation to the controller 140. On the other hand, when the switch to the sleep mode fails, each of the at least one of touch sensors 111, 112, and 113 transmits a result information notifying the failure of the sleep mode activation to the controller 140.

The controller 140 determines whether the sleep mode activation of the at least one of the touch sensors 111 to 113 is completed based on the sleep mode activation result (S130). When the sleep mode activation of each of the at least one of touch sensors 111, 112, and 113 is completed, the controller 140 waits for a preset time and performs operations again from S110.

When the at least one of the touch sensors 111, 112, and 113 fails to activate the sleep mode for a predetermined number of times or more, the controller 140 determines that the at least one of the touch sensors 111, 112, and 113, which failed to activate the sleep mode, has failed and stores a failure code in the memory 142 (S140). When power is supplied to the vehicle 100 later, the controller 140 may output a touch sensor failure notification to a cluster and/or an infotainment device based on the failure code.

In S110, when the smart key 10 is sensed in the vicinity of the vehicle, the controller 140 maintains a current operation mode of each touch sensor 111, 112, or 113 (S150). In other words, the controller 140 allows each touch sensor 111, 112, or 113 to maintain the wake-up mode (or the active mode).

Figure 4:
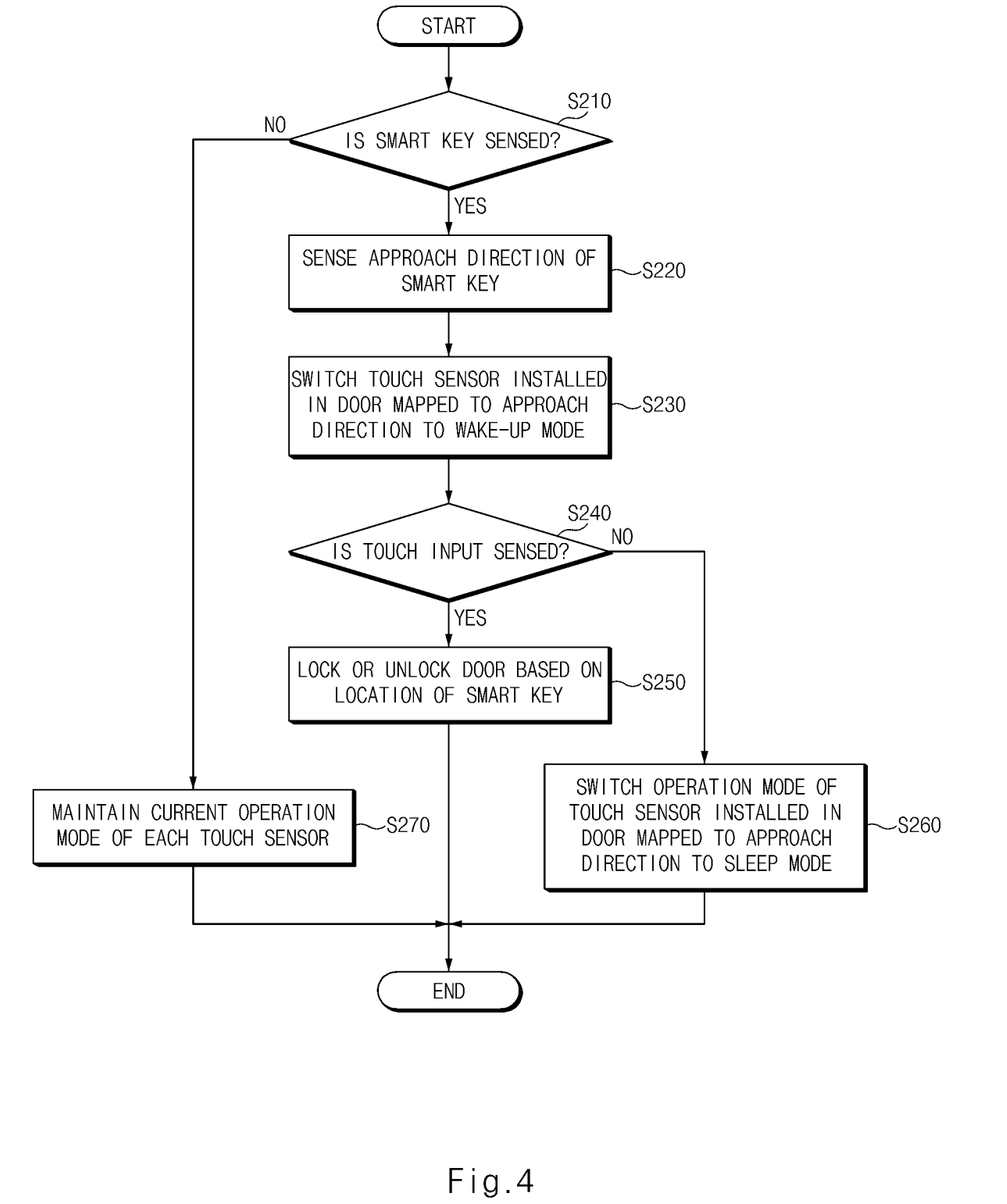
FIG. 4 is a flowchart illustrating a method for preventing a malfunction of a touch sensor in a vehicle door according to an embodiment of the present disclosure.

FIG. 4 is a flowchart illustrating a method for preventing a malfunction of a touch sensor in a vehicle door according to an embodiment of the present disclosure.

The controller 140 determines whether the smart key 10 is sensed in the vicinity of the vehicle (S210). The controller 140 drives the LF antenna 121 to search for the smart key 10 located in the vicinity of the vehicle, and transmits the searching signal as the LF signal. The controller 140 may transmit the searching signal by sequentially operating the at least two LF antennas mounted on the vehicle 100 based on a priority for every predetermined search cycle. When receiving the response signal from the smart key 10 within the predetermined time after transmitting the searching signal, the controller 140 determines that the smart key 10 is located in the vicinity of the vehicle (that is, the smart key is sensed). On the other hand, when the response signal is not received from the smart key 10 within the predetermined time after transmitting the searching signal, the controller 140 determines that the smart key 10 has deviated from the vicinity of the vehicle (that is, the smart key is not sensed).

When the smart key 10 is sensed in the vicinity of the vehicle, the controller 140 senses the approach direction of the smart key 10 (S220). The controller 140 may determine the approach direction of the smart key 10 based on the reception timing of the response signal. In addition, the controller 140 may determine the approach direction of the smart key 10 based on the signal strength of the searching signal included in the response signal. For example, the controller 140 sequentially transmits the first searching signal, the second searching signal, and the third searching signal respectively through the first LF antenna, the second LF antenna, and the third LF antenna respectively mounted on the driver's seat door handle, the passenger seat door handle, and the trunk door. Then, the controller 140 receives the first response signal, the second response signal, and the third response signal respectively to the first searching signal, the second searching signal, and the third searching signal. In this connection, the controller 140 may measure the reception timings of the first response signal, the second response signal, and the third response signal. When the measured reception timings of the first response signal, the second response signal, and the third response signal are respectively 70 ms, 300 ms, and 50 ms, the controller 140 may determine that the smart key 10, that is, the user is approaching the trunk. Alternatively, the controller 140 may compare the signal strengths of the first searching signal, the second searching signal, and the third searching signal respectively included in the first response signal, the second response signal, and the third response signal, and may determine that the user is approaching the passenger seat when the signal strength of the second searching signal is determined to be the greatest.

The controller 140 switches the touch sensor 111, 112, or 113 installed in the door mapped to the determined approach direction of the smart key 10 to the wake-up mode (S230). In other words, the controller 140 wakes up the touch sensor 111, 112, or 113 installed in the vehicle door handle mapped to the determined approach direction of the smart key 10. For example, when the approach direction of the smart key 10 is the driver's seat, the controller 140 switches the operation mode of the touch sensor 111, 112, or 113 mounted in the driver's seat door handle to the wake-up mode.

The controller 140 determines whether the touch input of the user is sensed through the awakened touch sensor 111, 112, or 113 (S240). The awakened touch sensor 111, 112, or 113 may measure the change in the capacitance resulted from the touch of the user and output the high or the low signal based on a difference between the measured change and the preset threshold.

When the touch input of the user is sensed by the awakened touch sensor 111, 112, or 113, the controller 140 identifies the location of the smart key 10 to lock or unlock the vehicle door (S250). When the high signal is received from the awakened touch sensor 111, 112, or 113, the controller 140 may sense the distance between the vehicle 100 and the smart key 10. When the sensed distance exceeds the predetermined critical distance, the controller 140 locks the vehicle door through the door latch 130. In addition, when the sensed distance does not exceed the predetermined critical distance, the controller 140 unlocks the vehicle door through the door latch 130.

When the touch input is not sensed for the predetermined time by the awakened touch sensor 111, 112, or 113, the controller 140 switches the operation mode of the awakened touch sensor 111, 112, or 113 from the wake-up mode to the sleep mode (S260). In other words, when the touch sensor 111, 112, or 113 installed in the door that matches the approach direction of the smart key 10 wakes up and does not sense the touch input of the user for the predetermined time, the controller 140 allows the corresponding touch sensor 111, 112, or 113 to reactivate the sleep mode.

When the smart key 10 is not sensed in the vicinity of the vehicle in S210, the controller 140 maintains the current operation mode of each touch sensor 111, 112, or 113 (S270). In other words, the controller 140 allows each touch sensor 111, 112, or 113 to maintain the sleep mode.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the touch sensor mounted in the vehicle door is operated based on the approach direction of the smart key located outside the vehicle, thereby preventing a malfunction of the touch sensor and preventing vehicle discharge by reducing vehicle dark current consumption.

In addition, according to the present disclosure, a risk of vehicle theft is reduced by operating only the touch sensor mounted in the door in the approach direction of the user holding the smart key, so that a security of the vehicle may be secured.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle, comprising:
   a transceiver for transmitting a searching signal to a smart key located outside the vehicle and receiving a response signal from the smart key;
   at least one touch sensor mounted in a door of the vehicle to sense a touch input of a user in a capacitive scheme; and
   a controller configured to:
      determine an approach direction of the smart key based on the response signal;
      control to operate only a touch sensor installed in the door mapped to the approach direction among the at least one touch sensor; and
      store a failure code in a memory when the at least one touch sensor fails to activate a sleep mode for a predetermined number of times or more.

2. The vehicle of claim 1, wherein the transceiver includes:
   at least two antennas respectively installed on doors of the vehicle; and
   a communication circuit for transmitting searching signals and receiving response signals using the at least two antennas,
   wherein the communication circuit supports at least one of an Ultra Wideband (UWB), a Bluetooth (BLE), a Near Field Communication (NFC), a Radio Frequency Identification (RFID), or a Low Frequency (LF).

3. The vehicle of claim 2, wherein the controller is configured to:
   drive the at least two antennas in a predetermined order to respectively transmit the searching signals; and
   determine the approach direction of the smart key based on reception timings of the response signals to the transmitted searching signals, respectively.

4. The vehicle of claim 2, wherein the controller is configured to:
   drive the at least two antennas in a predetermined order to respectively transmit the searching signals; and
   determine the approach direction of the smart key based on signal strengths of the respective searching signals respectively included in the response signals to the respective transmitted searching signals.

5. The vehicle of claim 2, wherein the controller is configured to determine the approach direction of the smart key using a triangulation method.

6. The vehicle of claim 1, wherein the controller is configured to switch an operation mode of the touch sensor installed in the door mapped to the approach direction from a sleep mode to a wake-up mode.

7. The vehicle of claim 6, wherein the controller is configured to lock or unlock the vehicle door based on a location of the smart key when sensing the touch input of the user through the touch sensor installed in the door mapped to the approach direction.

8. The vehicle of claim 7, wherein the controller is configured to unlock the door mapped to the approach direction when a distance between the smart key and the vehicle is equal to or less than a predetermined critical distance.

9. The vehicle of claim 7, wherein the controller is configured to switch the operation mode of the touch sensor from the wake-up mode to the sleep mode when the touch input of the user is not sensed for a predetermined time through the touch sensor installed in the door mapped to the approach direction.

10. A method for preventing a malfunction of at least one touch sensor mounted in a door of a vehicle, the at least one touch sensor configured to sense a touch input of a user in a capacitive scheme, the method comprising:
    determining, by a controller, an approach direction of a smart key based on a response signal from the smart key to a searching signal transmitted by a transceiver of the vehicle to search for the smart key located outside the vehicle;
    controlling, by the controller, to operate only a touch sensor installed in a door mapped to the approach direction among the at least one touch sensor; and
    storing, by the controller, a failure code in a memory when the at least one touch sensor fails to activate a sleep mode for a predetermined number of times or more.

11. The method of claim 10, wherein determining the approach direction of the smart key includes:
    transmitting the searching signals respectively through at least two antennas based on a wireless communication technology; and
    receiving the response signals using the wireless communication technology, wherein the wireless communication technology is used at least one of an Ultra Wideband (UWB), a Bluetooth (BLE), a Near Field Communication (NFC), a Radio Frequency Identification (RFID), or a Low Frequency (LF).

12. The method of claim 11, wherein transmitting the searching signals includes: driving the at least two antennas in a predetermined order and transmitting the searching signals respectively through the antennas.

13. The method of claim 10, wherein determining the approach direction of the smart key includes:
    determining the approach direction based on reception timings of the respective response signals or signal strengths of the respective searching signals included in the respective response signals.

14. The method of claim 10, wherein controlling to operate only the touch sensor installed in the door mapped to the approach direction includes:
    instructing, by the controller, the touch sensor installed in the door mapped to the approach direction to activate a wake-up mode; and
    switching, by the touch sensor installed in the door mapped to the approach direction, an operation mode from a sleep mode to the wake-up mode.

15. The method of claim 10, further comprising:
    sensing the touch input of the user through the touch sensor installed in the door mapped to the approach direction; and
    locking or unlocking the door based on a location of the smart key when the touch input of the user is sensed.

16. The method of claim 15, wherein locking or unlocking the door includes:
    detecting a distance between the smart key and the vehicle; and unlocking the door mapped to the approach direction when the detected distance is equal to or less than a predetermined critical distance.

17. The method of claim 15, further comprising:
switching an operation mode of the touch sensor from a wake-up mode to a sleep mode when the touch input of the user is not sensed for a predetermined time through the touch sensor installed in the door mapped to the approach direction.

18. The method of claim 10, further comprising:
instructing the at least one touch sensor to activate a sleep mode when the response signal is not received for a predetermined time.

* * * * *